US007281045B2

(12) United States Patent
Aggarwal et al.

(10) Patent No.: US 7,281,045 B2
(45) Date of Patent: Oct. 9, 2007

(54) PROVISIONING MANAGER FOR OPTIMIZING SELECTION OF AVAILABLE RESOURCES

(75) Inventors: Vijay Kumar Aggarwal, Austin, TX (US); David Werner Bachmann, Leander, TX (US); Uzi Hardoon, Golden Beach, FL (US); Craig M. Lawton, Raleigh, NC (US); Raymond P. Pekowski, Austin, TX (US); Christopher Andrew Peters, Round Rock, TX (US); Puthukode G. Ramachandran, Austin, TX (US); Lorin Evan Ullmann, Austin, TX (US); John Patrick Whitfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 10/926,585

(22) Filed: Aug. 26, 2004

(65) Prior Publication Data

US 2006/0047813 A1    Mar. 2, 2006

(51) Int. Cl.
*G06F 15/173* (2006.01)
(52) U.S. Cl. .................. 709/226; 709/228; 718/105
(58) Field of Classification Search ............. 709/226, 709/228; 718/105
See application file for complete search history.

(56) References Cited

U.S. PATENT DOCUMENTS 6,587,866 B1 * 7/2003 Modi et al. ................ 718/105
6,665,702 B1 * 12/2003 Zisapel et al. ............. 718/105
2002/0161873 A1 * 10/2002 McGuire .................... 709/223
2003/0069974 A1 * 4/2003 Lu et al. .................... 709/226
2003/0115259 A1 * 6/2003 Lakshmi Narayanan .... 709/203
2003/0149755 A1 * 8/2003 Sadot ........................ 709/223
2003/0195984 A1 * 10/2003 Zisapel et al. ............. 709/238
2006/0031506 A1 * 2/2006 Redgate .................... 709/226

* cited by examiner

*Primary Examiner*—Thu Ha Nguyen
(74) *Attorney, Agent, or Firm*—Cas Salys; Anthony V. S. England

(57) ABSTRACT

A method and software for fulfilling a resource request in a data processing network includes specifying characteristics of the requested resource responsive to detecting the resource request. A set of attributes is then derived from the specified characteristics. The specified characteristics indicate broad or general properties of the needed resource while the derived attributes preferably indicate the hardware and software components of a resource ideally suited to fulfill the resource request. Attribute information associated an available resource is then evaluated against the attributes derived from the specified characteristics. An available resource is then selected, based on the evaluation, to satisfy the resource request. The attributes of the selected resource best match the attributes derived from the specified characteristics. The requested resource may be a server resource and specifying the characteristics of the requested resource may includes specifying a server type from a constrained set of server types.

22 Claims, 6 Drawing Sheets

PROVISIONING MANAGER FOR OPTIMIZING SELECTION OF AVAILABLE RESOURCES

BACKGROUND

1. Field of the Present Invention

The present invention is in the field of data processing networks and, more particularly, data processing networks in which resources from a/pool of available resources are allocated as needed.

2. History of Related Art

In the field of information technology (IT), provisioning is an increasingly important concept. Provisioning, as the term is used in this disclosure, refers to functionality that enables an environment such as a data center to allocate IT resources as they are needed. In a fully automated provisioning implementation, a data center may respond to variations in load by allocating and deallocating servers to a particular server cluster.

A web server cluster, for example, may require more servers during peak demand periods (such as when consumers are likely to be accessing the cluster) while a database server cluster may be configured to execute the bulk of its tasks at other times. In this scenario, provisioning may include allocating servers from a pool of available server resources to the web server cluster during normal business hours, deallocating some servers from the web server cluster after hours, and allocating server resources to the database server cluster during off hours.

This simple example illustrates a primary benefit of provisioning, namely, dynamic allocation of resources to conserve the amount of total resources required. Instead of configuring the database server cluster with sufficient server resources to handle the peak database workload and the web server cluster with sufficient server resources to handle the peak web server workload, the total resources required are reduced by using server capacity more efficiently. In addition, automated provisioning reduces the amount of time and human effort required to configure resources for a particular task and thereby reduces management overhead.

To date, however, provisioning solutions have tended to treat like-type resources as homogenous. All servers, for example, are viewed by conventional provisioning solutions as interchangeable and, in fact, some automated provisioning solutions require and assume that all resources in a provisioning pool are substantially identical. In many environments, however, a much more realistic and less constraining assumption is that each resource may possess qualities or characteristics that make it a more suitable (or less suitable) candidate for a particular provisioning solution than other resources. It would be desirable to implement a system and method for optimizing the selection of resources during provisioning sequences.

SUMMARY OF THE INVENTION

The identified objective is achieved with a method and software for fulfilling a resource request in a data processing network according to the present invention. The invention includes specifying characteristics of the requested resource responsive to detecting the resource request. A set of attributes is then derived from the specified characteristics. The specified characteristics indicate broad or general properties of the needed resource while the derived attributes preferably indicate the hardware and software components of a resource ideally suited to fulfill the resource request. Attribute information associated with an available resource is then evaluated against the attributes derived from the specified characteristics. An available resource is then selected, based on the evaluation, to satisfy the resource request. The attributes of the selected resource best match the attributes derived from the specified characteristics. The requested resource may be a server resource and specifying the characteristics of the requested resource may includes specifying a server type from a constrained set of server types. Deriving the attributes of the needed resource from the general characteristics specification may include accessing a server type profile that indicates the attributes corresponding to each server type. Testing may be employed to gather performance data for a selected resource to refine or modify a selection.

BRIEF DESCRIPTION OF THE DRAWINGS

Other objects and advantages of the invention will become apparent upon reading the following detailed description and upon reference to the accompanying drawings in which.

Figure 1:
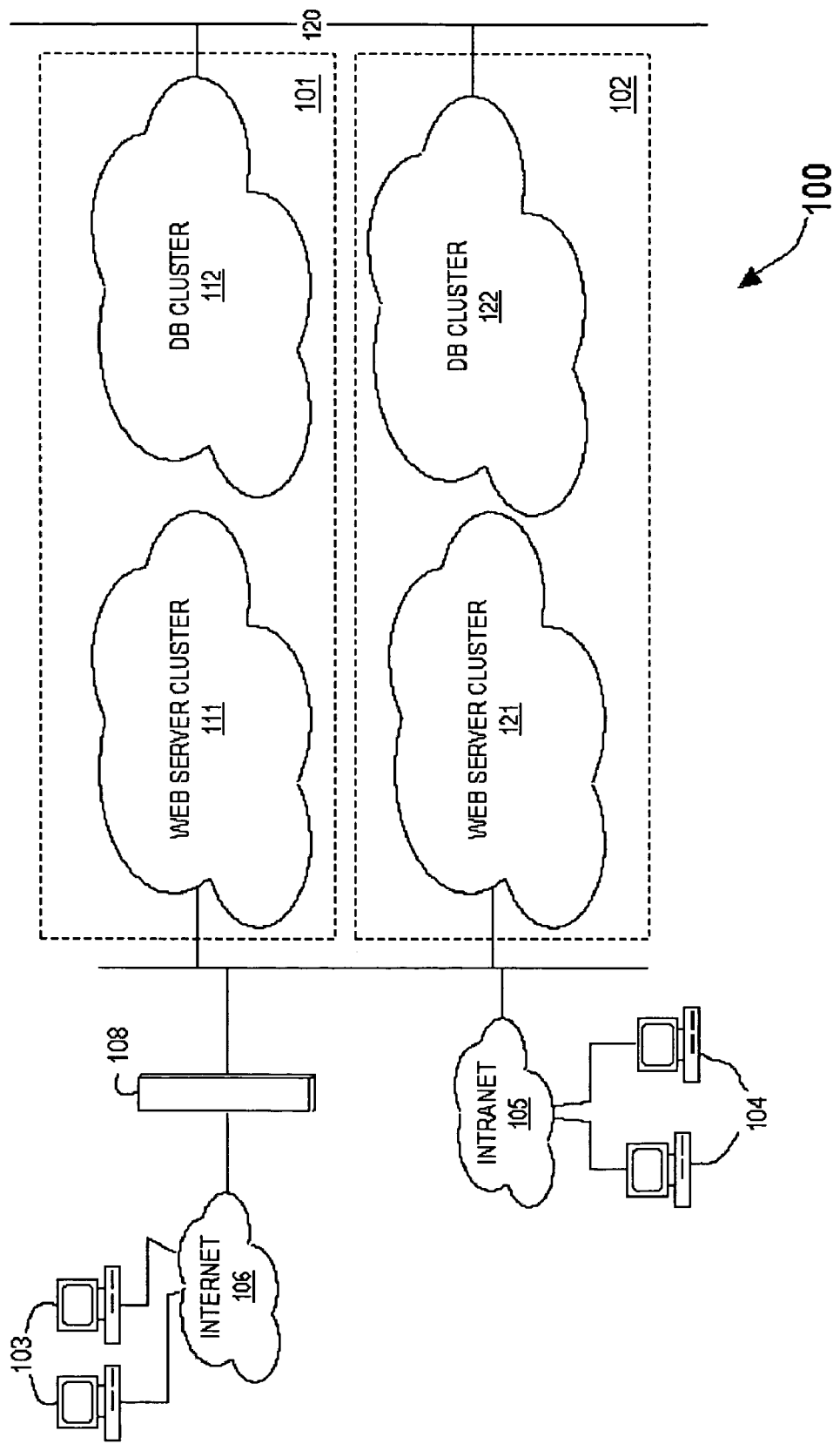
FIG. 1 is a diagram of selected elements of a data processing network including a data center according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a system and method for provisioning resources in a data processing network. The provisioning mechanism according to the present invention includes determining the optimal resource from a pool of available resources. When a provisioning request is generated, either automatically or by a system administrator, a provisioning manager evaluates the characteristics of available resources according to the needs specified in the provisioning request. The provisioning manager identifies the available resource having the characteristics most suitable to fulfill the provisioning request. In this implementation, the provisioning manager views each available resources in terms of its unique characteristics and matches available resources to each need accordingly.

Turning to the drawings, FIG. 1 is a diagram of selected elements of a data processing network 100 according to one embodiment of the present invention. In the depicted embodiment, data processing network 100 includes two applications, each having its own web server cluster and database cluster. Specifically, network 100 as depicted includes a first application 101 having a first web server cluster 111 and a first database server cluster 112. A second application 102 of network 100 includes a second web server cluster 121 and a second database server cluster 122. Web server clusters 111 and 121 are connected to a network to which internal users 104 have access via an enterprise intranet 105 and to which external users 103 have access via internet 106 and an intervening firewall 108. Access to the database clusters 112 and 122 is via a backend network 120 not accessible via either the internet 106 or the enterprise's intranet 105.

For purpose of illustration, first application 101 is a "commerce" application that represents the commercial focus of the enterprise while second application 102 is an "internal" application such as a human resources application. First application 101 is most likely an on-demand application that is characterized by unpredictable demand yet requires excellent response time. Second application 102 represents an application that is generally more predictable and generally requires lower response time although, when executing at its peak (e.g., processing payroll in a large corporation), requires significant computational capability. Security and availability are significant concerns in both applications. Thus, applications 101 and 102 are significantly different in terms of their needs and requirements as are their component web server clusters and database server clusters. The varying loads of each application suggest that dynamic allocation of resources can lead to a more cost effective implementation than simple static provisioning (in which a server cluster is configured with sufficient resources to function at its peak expected demand). The present invention supplements previous provisioning implementations by recognizing that available resources may not be equally suitable for allocation to different server clusters.

Figure 2:
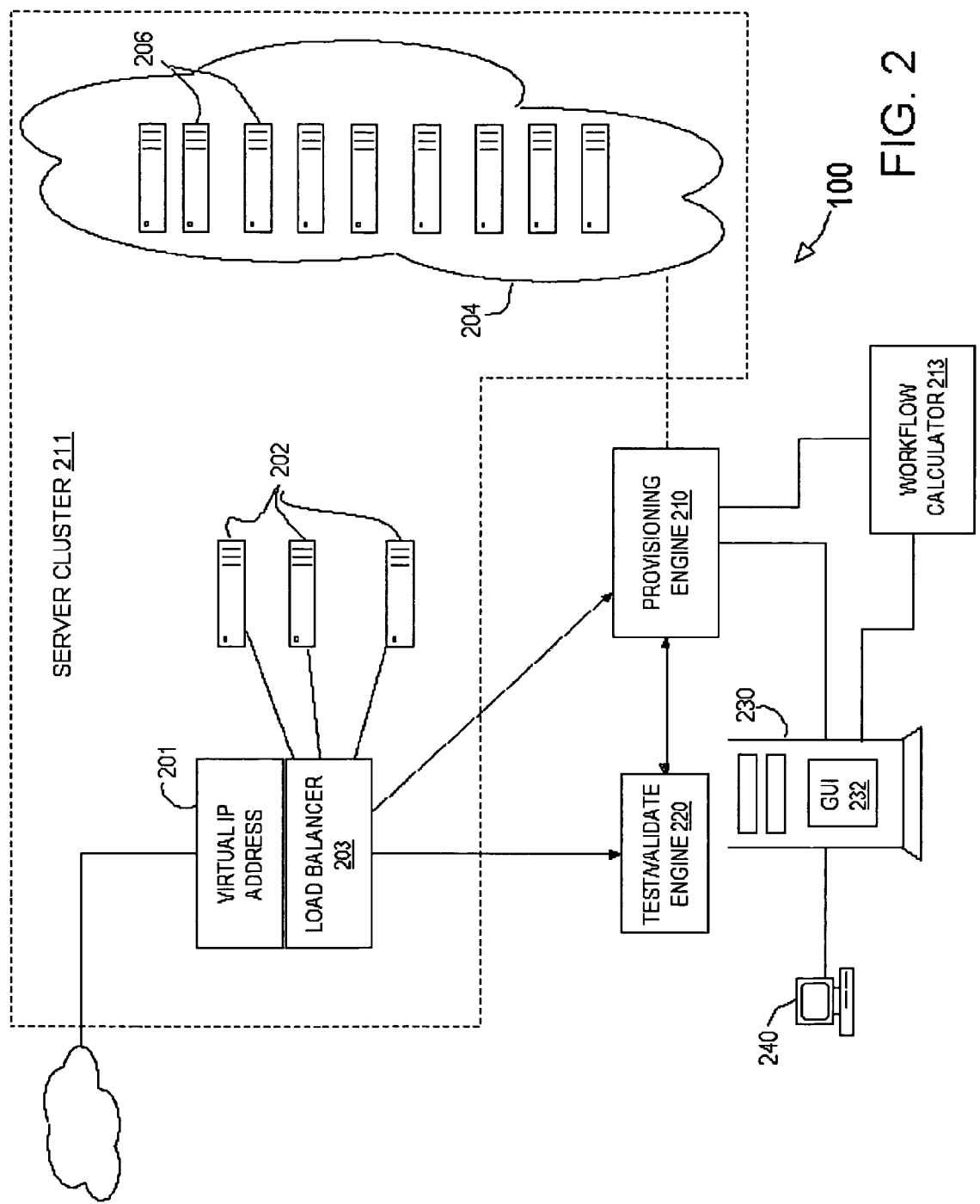
FIG. 2 is a diagram of a server cluster in the data center of FIG. 1 according to an embodiment of the invention.

Referring now to FIG. 2, a second depiction of data processing network 100 of FIG. 1 is presented to emphasize details of individual server clusters and the provisioning resources as well. In FIG. 2, network 100 includes a generic server cluster 211, a provisioning manager 210, a workflow calculator 213, and an optional validation engine 220. Server cluster 211 represents any of the server clusters in FIG. 1 (i.e., server clusters 111, 112, 121, and 122). The depicted embodiment of server cluster 211 includes a cluster manager 201, a set of replica servers 202, and a pool 204 of available resources 206. The available resource pool 204 preferably represents a common pool of resources that are available to each of the server clusters depicted in FIG. 1. In the implementation described herein, each resource is a server device that includes processing capability (CPU cycles), memory capacity, disk storage capacity, and I/O device capacity such as network interface cards. In other implementations, resources may be more tailored such as, for example, processor resources, memory resources, storage resources, and I/O or network resources.

Cluster manager 201 presents a virtual IP address to the external world. Cluster manager 201 may present a unique virtual IP address for multiple clusters or applications. A primary function of cluster manager 201 is to distribute incoming requests to the replica servers 202. Replicas servers 202 do the actual processing of incoming requests. The IP addresses of the replica serves 202 may be, and most likely are, hidden from the end user by cluster manager 201. In a likely implementation, the services provided by each replica server 202 are substantially equivalent. Incoming requests are distributed to replica servers 202 by a load balancer 203 according to a predetermined algorithm such as a round robin technique.

The provisioning manager 210 according to the present invention is connected to or has access to load balancer 203, the available resource pool 204, the management server 230, and an optional validation engine 220. From time to time, load balancer 203 may determine in the normal course of operation that the amount of resources allocated to sever cluster 211 is inappropriate for the current loading. When the incoming requests are outpacing the cluster's ability to process them, for example, the resource shortage may be detected by the load balancer 203 or by aggregated inputs from CPU, memory, and software usage monitors on the individual resources. Conversely, the load balancer 203 or usage monitors may also detect when the amount of replica resources could be reduced without having a substantial negative impact on the application's performance.

In an "automated" provisioning embodiment, load balancer 203 may, upon detecting a shortage (or excess) of allocated resources, send a message, referred to herein as a provisioning request, directly to provisioning engine 210. In response to the provisioning request, provisioning engine 210 according to the present invention is enabled to select the available resource 206 in resource pool 204 that is best able to meet the requirements or preferences indicated in the provisioning request. In another implementation, load balancer 203 may issue provisioning requests to management server 230. In this implementation, a system administrator detects the provisioning request at a management server terminal 240. Management server 230 presents the administrator with a GUI 232 that facilitates the administrator's task.

The depicted embodiment of network 100 includes a workflow calculator 213 that communicates with management server 230 and provisioning engine 210. Workflow calculator 213 is preferably configured to enable an administrator to make a determination or estimation of the quantity of resources needed to support a particular application. A user interface, such as GUI 232, may provide the administrator with a form or page for estimating resource requirements. Workflow calculator 213, as an example, may receive information indicative of an estimate of the number of transactions per hour a particular application is expected to receive and the average amount of storage and/or CPU time required to process each transaction. From such information, workflow calculator 213 is configured to determine the number of servers or other resources that an application requires. If the resources currently allocated to an application differ from the necessary resources as estimated by workflow calculator 213, a provisioning request may be generated and delivered to provisioning manager 210.

In one embodiment, provisioning engine 210 is implemented to receive provisioning requests that specify broad characteristics of the requested resource. The provisioning request may define the requirements of the requested resource in terms of the needs the resource must fulfill rather than in terms of the specific hardware or software on the resource itself. The provisioning request may indicate, for example, the type of server cluster for which a requested resource is needed, how fast the requested resource must be implemented, and how responsive the requested resource must be in operation. The provisioning engine according to one embodiment of the invention converts this broad description into a set of specific resource attributes that might indicate, in the case of a server resource, the processing capacity the sever needs, the total and available memory, the total and available disk space, and any software applications that must be installed.

This embodiment of the invention beneficially enables administrators who may not be intimately familiar with the hardware/software details of the available resources 206 to interact with provisioning engine 210. The administrator is required only to describe a non-specific "personality" or profile of the desired resource and information about the priority of the desired resource, to enable provisioning engine 210 to select the available resource 206 that best matches the specified criteria. The personality of a resource, as used in the disclosure, refers to the general characteristics that the resource must possess. In the context of provisioning servers to server clusters, for example, the personality of the server is determined by the type of server cluster such that there is a database server profile, a web server profile, and an application server profile.

As an example, an administrator may, upon receiving a provisioning request from cluster manager 201 or load balancer 203, determine from the request that the first application web server cluster 111 of FIG. 1 requires an additional resource. In response, the administrator may interact with provisioning engine 210 via GUI 232 to specify that a resource is needed for a web server cluster and that, because web server cluster 111 is a commerce application, that the selected machine must be provisioned with high priority. Notice that the information specified by the administrator does not specify anything about the hardware or software components or architecture of the requested resource. Provisioning engine 210 then uses information provided by the administrator to determine a set of attributes that the chosen resource should posses and then evaluates the attributes of the available resources for a best match. Thus, whether the provisioning request is provided directly to provisioning engine 210 or via management server 30, the provisioning request may specified the requested resource in terms of a set of broad and generic characteristics.

Figure 7:
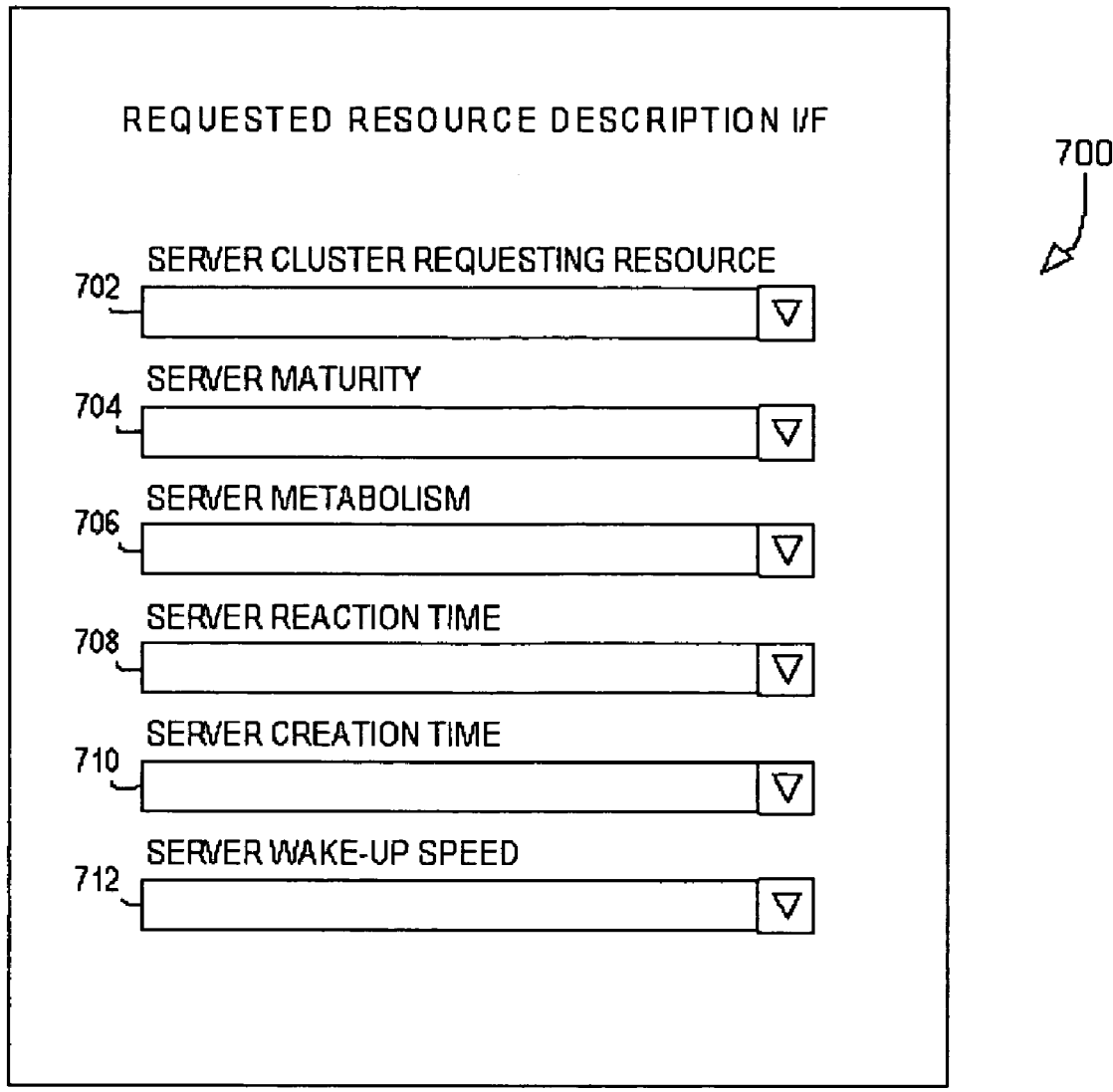
FIG. 7 is a user interface suitable for qualitatively specifying attributes of a requested resource according to one embodiment of the present invention.

In an embodiment emphasized by the implementation of GUI 232 presented in FIG. 7, an administrator may specify the attributes of a requested or required resource in a qualitative or abstract manner. In this type of embodiment, provisioning manager 210 is configured to derive quantitative attributes that the needed resource should possess from the qualitative attribute description specified by the administrator. This approach is another example of extending resource provisioning capability and functionality to administrators who may lack extensive knowledge of the hardware and software specifics of a given resource.

Referring to FIG. 7, selected elements of an exemplary GUI 232 of this type are depicted. In the depicted embodiment, GUI 232 of FIG. 7 enables an administrator to specify the attributes of a needed or required resource in terms of parameters that include the resource's maturity (704), metabolism (706), reaction time (708), creation time (710), and wake-up speed (712). In this context, a resource's maturity refers to the amount of data creation the resource is expected to be able to support. A fully mature resource is appropriate only when little additional data creation is expected to occur whereas an "infant" resource (one having capacity for extensive data creation) is appropriate when a large amount of data growth is expected. A resource's metabolism is indicative of the resource's computational ability. A resource with a high metabolism is appropriate for CPU intensive environments and applications or in environment characterized by frequent disk accesses (reads and writes). The reaction time of a resource refers to how quickly the resource needs to respond to incoming requests. A quick response is needed for mission critical clusters or applications such as those clusters that interface with customers. Applications that execute in the background or during specified times of the day may not require responsive as a primary characteristic. Response time is affected, not only by the resource's CPU power, but also by secondary factors such as the size of the resources cache, the latency associated with disk accesses, and so forth.

A resource's creation time characteristic is indicative of how much time is required to provision a new server (or other resource) to accommodate the task under consideration. If a short creation time is specified by the administrator because the resource is needed quickly, resources that are already fully or at least partially provisioned for the task are prioritized. If a long creation time is acceptable, the provisioning manager may opt to provision a new resource from "scratch." A resource's wake-up speed indicates how much time the resource needs to reboot or restart an application. A resource that has a fast wake-up speed may be needed when the resource is intended for an application or environment in which frequent reboots may be expected. A resource having a slow wake up speed may be acceptable in other environment where boot events are expected to be relatively infrequent.

The provisioning manager 210 is configured to make a static match assessment or prediction between an available resource and the resource as specified qualitatively by the administrator. The provisioning manager 210, for example, might map or correlate the maturity attribute to the amount of available disk space on an available resource, the metabolism and reaction time to the resource's CPU speed, and the creation time and wake-up time attributes to the number of applications, middleware modules, operating system type, and network speed.

Provisioning engine 210 has access to the pool 204 of resources 206 and, more specifically, has access to information indicative of the quantitative attributes of the available resources 206. A resource's quantitative attributes refer to the specific hardware and software components and architecture that the resource possesses. In one embodiment, each resource is "scanned" prior to being deposited in pool 204. Scanning refers to a well known software procedure in which the attributes of a data processing system are discovered by an application program executing on the system. Scanning code is generally able to discover the hardware attributes of a system such as the number, type, and clock speed of the servers CPU's, the amount of system memory (unallocated and allocated), the amount of disk space (free and available), and the number and type of peripheral devices such as network interfaces. In addition, scanning code is further able to discover the installed software attributes of a system including the operating system and version as well as any application programs that are installed on the system.

In one embodiment, the scanning code referred to above is executed prior to placing a resource in the pool 204 of available resources 206. The scanning code produces data for each available resource 206 that indicates the hardware and software attributes of the corresponding resource. In one implementation, this attribute information is stored in a platform neutral format such as an XML file.

Figure 3:
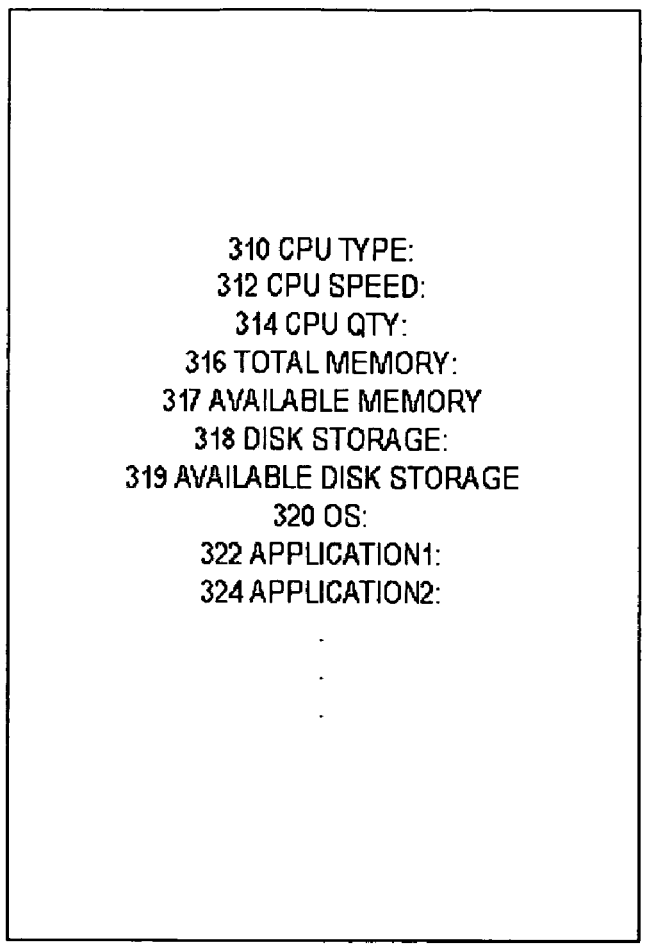
FIG. 3 illustrates an exemplary document suitable for identifying characteristics of a resource in the available resource pool in the server cluster of FIG. 2.

Referring to FIG. 3, an exemplary attribute file 301 is illustrated. In this example, attribute file 301 is preferably formatted as an XML file and includes information about a corresponding data processing system including the system's CPU type (310), CPU speed (312), CPU count or quantity (314), the amount of total system memory (316), and the amount of available system memory (317), the amount of total disk storage (318) and the amount of available disk storage (319), the installed operating system, if any (320), and any application programs (322, 324, etc.) that are currently installed on the system. In addition, attribute file 301 may include information such as the number of peripheral devices such as network adapters and so forth.

In this manner, attribute file 301 provides a snapshot of the current installed state of the corresponding data processing system. As an XML file, the specific format of attribute file 301 is implementation specific, but, once defined may be freely distributed among systems having different implementation platforms. The attribute files 301 corresponding to each available resource are most likely maintained by and stored on management server 230 of FIG. 2, but other implementations are possible including implementations in which the attribute files are stored locally on provisioning engine 210 or on the individual server systems themselves.

Portions of the present invention may implemented be as a sequence or set of computer executable instructions stored on a computer readable medium (i.e., computer software). In such embodiments, potions of the software code may be stored in a volatile storage medium such as a system memory when the code is being executed while other portions of the code may be stored in a persistent storage device such as a hard disk. The software code according to the present invention is suitable, when executed, for provisioning a data processing resource when needed by selecting an optimal resource from among a pool of available resources.

Figure 4:
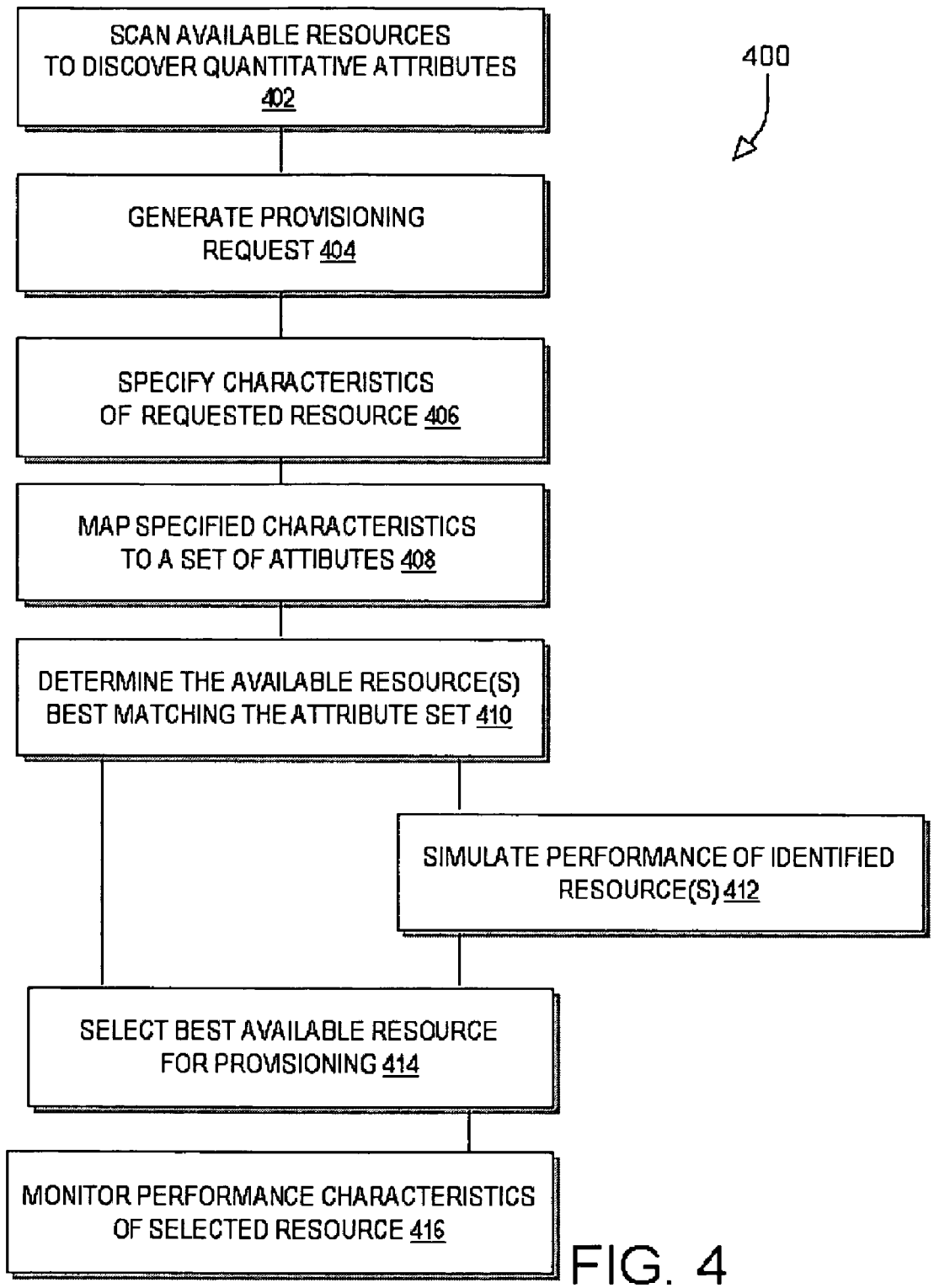
FIG. 4 is a flow diagram of a method of provisioning available resources in the data processing network of FIG. 1 according to one embodiment of the invention.

Referring to FIG. 4 now, one embodiment of software code according to the present invention is represented by a flow diagram of a provisioning method or process 400. In the depicted embodiment, method 400 includes discovering (block 402) attributes of each available resource, preferably through the scanning process described above with respect to FIG. 3. As attributes that are discoverable by scanning software, the attributes may be thought of as "quantitative" attributes to distinguish them from the set of "qualitative" characteristics that an administrator may use to describe a particular provisioning requirement. The attributes discovered in block 402 are attributes that describe the present hardware and software state of the corresponding resource.

Following the scanning of each available resource, a provisioning request is generated (block 404). The provisioning request may be initiated by a load balancer directly in response to a perceived change in the workload of each server cluster under the direction of the load balancer. Alternatively, the provisioning request may be manually generated by a system administrator in response to information received by the administrator from a management server or other similar resource As indicated in block 406, the qualitative characteristics of the needed resource are then specified. In the embodiment in which the systems administrator generates the provisioning request, the specification of these characteristics may be facilitated through the use of a GUI 232 (FIG. 2). GUI 232 may guide the system administrator, who may have little if any knowledge of the specific hardware and software configuration of the available resources, in specifying the needed resource such as by presenting the administrator with a constrained set of choices. In one implementation, for example, the system administrator may be able to indicate the type of server cluster for which the resource is needed, the priority of the provision request, and the required responsiveness of requested resource. The type of server cluster for which a resource is needed conveys general characteristics of the needed resource such as how much processing capacity the resource needs, how much storage the resource needs, and so forth. The type of server clusters may include, as examples, web server clusters, database server clusters, and application server clusters.

The priority of the request is indicative of how quickly the requested resource needs to be provisioned. The priority information may be used to indicate indirectly the state of the required resource. If, for example, a request is a high priority request that needs to be fulfilled as quickly as possible, an available resource that has all of its required software installed is a better candidate than an available resource that requires significant software installation, all else being equal. The responsiveness required of the requested resource indicates how quickly the provisioned resource must be able to process transactions. Web server applications that interact with customers, for example, must generally be very efficient in handling incoming requests. The responsiveness characteristics of the requested resource may influence the determination of the best available resource. A resource required for a customer application may require greater processing capacity than a similar resource directed toward an internal application.

Figure 6:
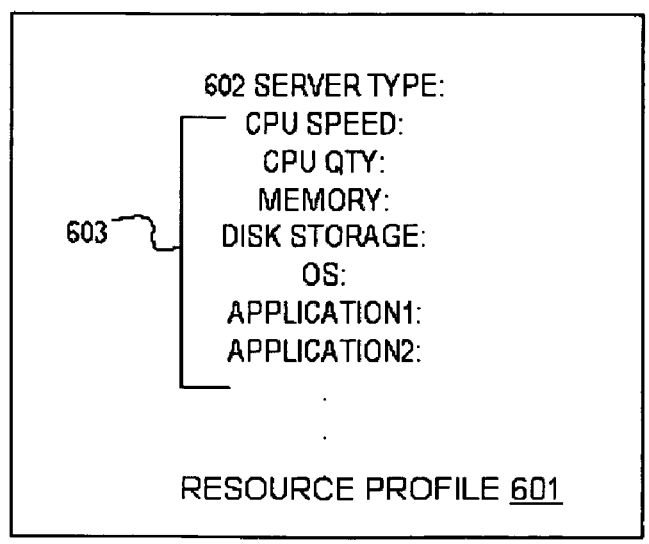
FIG. 6 illustrates a resource profile according to one embodiment of the invention.

Following specification of the needed resource's general characteristics, the provisioning engine according to the present invention identifies the best available resource by first mapping (block 408) the general characteristics specified in block 406 to a set of specific attributes that a resource ideally suited to fulfill the provisioning request would have. The mapping of characteristics to attributes is achieved according to one implementation using resource profiles. Referring to FIG. 6, an exemplary resource profile 601 is depicted for the case of a server resource. In this case, the profile 601 indicates, via parameter 602, the server type and a set of attributes 603 that a resource of that type should possess ideally. Provisioning engine 210 may have access to a different resource profile for each type of resource type that it supports. In the case or server resources, for example, provisioning manager 210 preferably has access to a web server profile, an application server profile, and a database server profile, as well as other suitable profile types depending upon the application.

Provisioning engine 210 uses profiles 601 to construct a set of attributes based on the specified characteristics. The constructed attributes are then used to provide the basis for selecting among the set of available resources. If the requested resource is specified as a database server, for example, provisioning manager 210 may access a database server profile, in conjunction with any priority and responsive characteristics specified in the provisioning request, to determine that the requested resource should include an installed a particular combination of hardware and software resources. The database server profile may indicate, for example, that the server should have an installed database application. The scanned attributes of an available resource may be checked (via the attributed files 301) to see if the resource includes an installed database application such as DB2 from IBM Corporation. If, on the other hand, the requested resource is needed for a web server application, the attributes of a candidate resource may be consulted to determine if a web server application, such as the Apache web server is installed (the Apache web server is a fully documented, open source web server application. See, Apache HTTP Server Version 2.0 documentation at the Apache Software Foundation web site-www.apache.org).

Having derived a set of attributes from a provisioning request, provisioning manager 210 then determines (block 410) the available resource (or resources) having attributes that best match the derived attributes. Provisioning engine 210 is configured with or has access to prioritization information, associated with each resource profile, that enables the provisioning engine to rank the available resources in terms of their compatibility with the desired attributes for the requested resource. Resource specific prioritization information enables provisioning manager 210 to heuristically determine the best match between a requested resource and the resources that are currently available. To illustrate, consider a case in which provisioning engine 210 is able to unambiguously narrow the set of available resources down to two available resources in response to a provisioning request. The first of the two resources has greater processing capability, but less storage capacity. If the requested resource is a for a database server for use in an internal application, storage capacity might be prioritized higher than processing capability and the server having greater storage capacity is selected. If the request is for a custom interface web server, prioritization information in the web server profile storage probably indicates that storage capacity is secondary to processing capability and the server having greater processing capability is selected.

Having selected one or more available resources as candidates to fulfill the provisioning request, one embodiment of method 400 includes optional testing and validation of the selected resources to confirm or improve the selection. This optional testing and validation processing is represented in FIG. 4 by reference numeral 412.

Referring back to FIG. 2 momentarily, network 100 is shown as including a test/validation engine 220 that communicates with provisioning manager 210. Testing engine 220 is preferably able to gather empirical performance data for selected resources and configurations. In one implementation, testing engine 220 is beneficially employed to select between two candidate resources when the resource attribute information is not determinative. Consider a case in which the resource profile does not indicate a specific hardware or operating system platform for a specific resource type, but does indicate a specific application. If two available resources, both having an installed instance of the application program, have different hardware or operating system platforms, provisioning manager 210 is unlikely to be able to decide between the two resources based solely on the attribute information. In this case, the provisioning engine may invoke the testing/validation engine 220 to execute the application and gather performance metrics for both candidate systems. Based on the empirical performance data, provisioning engine 210 may make an informed decision regarding the best resource to select.

In another example, a single candidate resource is selected as a best match for a particular provisioning request. If the software platform is not specified in the request or in the attributes derived from the request, the provisioning manager 210 in conjunction with test/validation engine 220 may install various combinations of middleware on the selected resource and gather performance data for each specific configuration. In this manner, the provisioning engine can employ the test/validation engine to refine the resource selected to fulfill the provisioning request.

Regardless of whether testing is employed in the resource selection process, method 400 includes selecting and provisioning (block 414) the available resource that best matches the specified characteristics and derived attributes of the requested resource. Provisioning the selected resource in this context refers to an automated process of configuring the selected resource for the requesting application and allocating the selected resource to the appropriate server cluster. Provisioning of the selected resource is known in the field and may include the use of code similar to code in commercially distributed provisioning products such as the Tivoli Provisioning Manager from IBM Corporation.

In the depicted embodiment, method 400 further includes monitoring (block 416) the provisioned resource to determine if the selected resource performs adequately in operation. Monitoring of a resource may include logging of performance metrics for subsequent evaluation. The logged data may be used to modify the profiles for particular resource types if the resources being selected for fulfilling resource requests are not performing adequately against one or more parameters.

Figure 5:
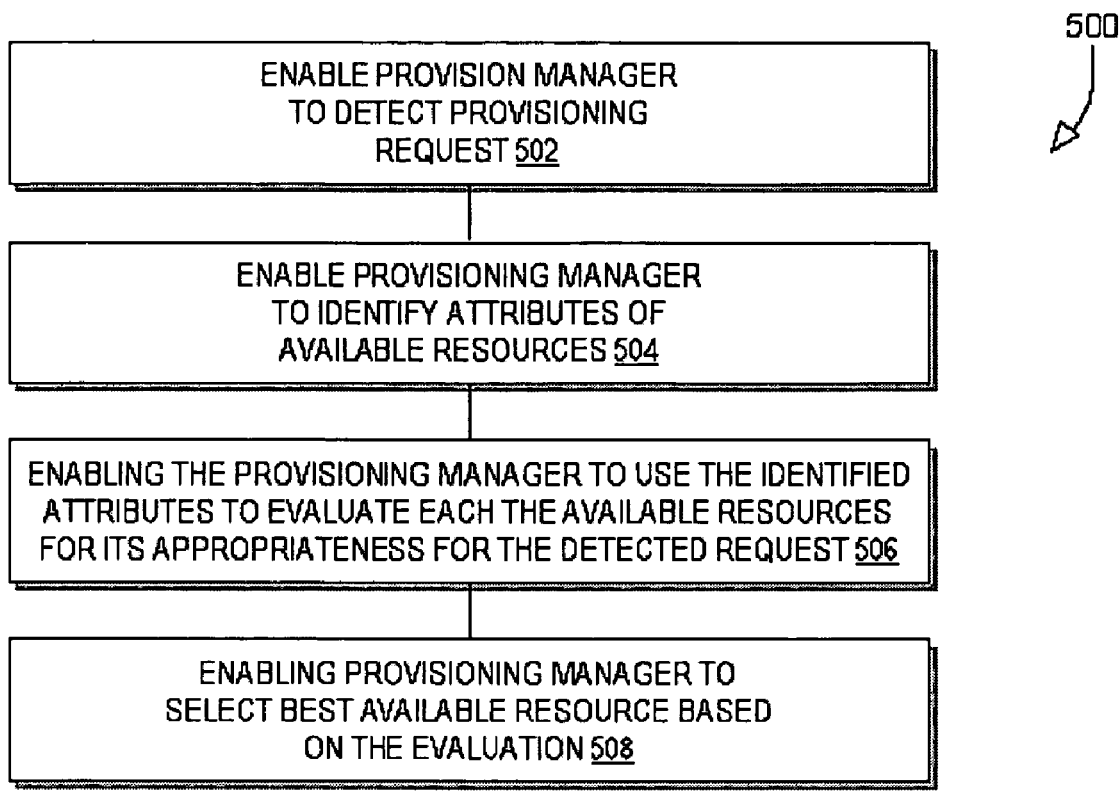
FIG. 5 is a flow diagram of a service for enabling optimized server allocation according to an embodiment of the invention.

In one embodiment, the present invention is implemented as a service for enabling a provisioning manager to select the best resource for a particular application from among a set of available resources. Referring to FIG. 5, a flow diagram conceptually depicts this service 500 according to one embodiment of the invention. In this embodiment, method 500 includes enabling (block 502) a provisioning manager to detect a provisioning request. The provisioning request, as described above, may be supplied directly to the provisioning manager from a load balancer or may come from a system administrator via a management server. The provisioning manager is further enabled (block 504), according to the depicted service, to identify attributes of the available resources. Identification of available resource attributes may include use of attribute files such as the attribute files 301 described above. The provisioning manger is further enabled (block 506) according to the embodiment of service 500 depicted in FIG. 5, to use the attribute information to evaluate each available resource for its appropriateness to fulfill the resource request. This evaluation may include the process of specifying characteristics of the requested resource, deriving a set of attributes corresponding to the specified characteristics, and matching the derived attributes against the attributes of the available resources as described above with respect to FIG. 4 blocks 406-410. The provisioning manager is further enabled (block 508) to select the best available resource to fulfill the resource request based its evaluation of the available resources. Thus, one embodiment of service 500 contemplates enabling a provisioning manager in a data center or other distributed or networked environment to perform the selection process described above with respect to FIG. 4. By enabling a provisioning manger to make optimized resource selections, the present invention beneficially improves the productivity of the data center environment by provisioning resources that are best suited for a particular task while also removing a significant constraint (the constraint of homogenous resource pool) typical of conventional provisioning implementations.

It will be apparent to those skilled in the art having the benefit of this disclosure that the present invention contemplates a method of selecting an optimal resource in response to a provisioning request. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer program product for fulfilling a resource provisioning request in a data processing system, the computer program product comprising computer executable code stored on a tangible, computer readable storage medium, the computer executable code comprising:

computer executable, code for discovering attributes of servers available for adding to a server cluster responsive to the resource provisioning request by scanning resources on a network of the processing system, wherein the discovered attributes include quantitative attributes, the quantitative attributes describing the servers in terms of respective hardware and software states thereof;

computer executable code, for specifying characteristics of a requested resource for the resource provisioning request, wherein the specified characteristics, the quantitative characteristics describing the requested resource in categorical terms including i) a server type, ii) a resource provisioning priority defining how quickly a server is to be added to a server cluster responsive to the resource provisioning request, and iii) a resource operational response time category defining how quickly operational requests are to be fulfilled by the added server;

computer executable code for deriving a set of attributes from the specified qualitative characteristics by reading a set of attributes defined in a profile for the server type of the specified qualitative characteristics, the set of attributes in the profile being defined in terms including the same terms as the quantitative attributes of the discovered server, wherein the derived attributes are indicative of components of a server ideally suited to fulfill the resource provisioning request;

computer executable code for evaluating the discovered attributes associated with respective ones of available servers against the attributes derived from the specified characteristics; and computer executable code for selecting, based at least in part on the evaluation, one of the available server to satisfy the resource provisioning request, wherein the attributes of the selected server best match the attributes derived from the specified characteristics.

2. The computer program product of claim 1, wherein a graphical user interface GUI containing a user to select from among a set of server types, wherein the server types include a web server type, a database server type, and an application server type.

3. The computer program product of claim 1, wherein the profile further includes prioritization information and wherein the computer executable code for evaluating the attributes of the available servers includes computer executable code for ordering two or more available servers according to the prioritization information.

4. The computer program product of claim 1, further comprising, computer executable code for testing performance of the selected server prior to adding the selected server.

5. The computer program product of claim 4, wherein the computer executable code for testing the performance includes computer executable code for installing different software configurations on the selected server and testing the performance of each software configuration to determine a most efficient configuration.

6. The computer program product of claim 4, wherein the computer executable code for testing the performance includes computer executable code for testing the performance of two or more candidate servers and selecting the server with best performance.

7. The computer program product of claim 1, wherein the computer executable code for evaluating the discovered attribute includes computer executable code for accessing attribute files associated with each available server.

8. The computer program product of claim 1, further comprising computer executable code enabling an administrator to specify the qualitative characteristic for the server of the resource provisioning request.

9. A data processing system, comprising:

a set of servers to process transactions;

a load balancer to receive requests and to distribute received requests to the set of servers;

a pool of available servers available for adding to the set of servers responsive to a resource provisioning request;

a provisioning manager to receive provisioning requests and to select a server from the pool of available servers to add to the set of servers, the provisioning manger including:

a subsystem including a processor and a storage device connected to the processor, wherein the storage device has stored thereon a resource provisioning program for controlling the processor, and wherein the processor is operative to execute the resource provisioning program for performing the steps of:

discovering attributes of the servers of the pool by scanning resources on a network, wherein the discovered attributes include quantitative attributes, the quantitative attributes describing the servers in terms of respective hardware and software states thereof;

specifying characteristics of a requested resource for the resource provisioning request, wherein the specified characteristics include qualitative characteristics, the qualitative characteristics describing the requested resource in categorical terms including i) a server type, ii) a resource provisioning priority defining how quickly a server is to be added to a server cluster responsive to the provisioning request, and ii) a resource operational response time category defining how quickly operational requests are to be fulfilled by the added server;

deriving a set of attributes from the specified qualitative characteristics by reading a set of attributes defined in a profile for the server type of the specified qualitative characteristics, the set of attributes in the profile being defined in terms including the same terms as the quantitative attributes of a discovered servers, wherein the derived attributes are indicative of components of a resource ideally suited to fulfill the resource provisioning request;

evaluating the discovered attributes associated with respective ones of available servers against the attributes derived from the specified characteristics; and selecting, based at least in part on the evaluation, one of the available servers to satisfy the resource provisioning request, wherein the attributes of the selected server best match the attributes derived from the specified characteristics.

10. The system of claim 9, wherein the profile information further includes prioritization information and the processor is operative to execute the resource provisioning program for performing the steps of: evaluating the attributes of the available servers includes ordering two or more available servers according to the prioritization information.

11. The system of claim 9, wherein the processor is operative to execute the resource provisioning program for performing the steps of:
testing the performance of the selected server prior to adding the selected server.

12. The system of claim 11, wherein testing the performance includes the steps of:
installing different software configurations on a selected server; and
testing the performance of each software configuration to determine a most efficient configuration.

13. The system of claim 11, wherein testing the performance includes the steps of:
testing the performance of two or more candidate servers; and selecting the server with the best performance.

14. The system of claim 9, wherein evaluating the discovered attribute includes the step of: accessing attribute files associated with each available server.

15. A method for fulfilling a resource provisioning request in a data processing system, the method comprising the steps of:
discovering attributes of servers available for adding to a server cluster responsive to the resource provisioning request by scanning resources on a network of the system, wherein the discovered attributes include quantitative attributes, the quantitative attributes describing the servers in terms of respective hardware and software states thereof;
specifying characteristics of requested resource for the resource provisioning request, wherein the specified characteristics include qualitative characteristics, the qualitative characteristics describing the requested resource in categorical terms including i) a server type, ii) a resource provisioning priority defining how quickly a server is to be added to a server cluster responsive to the provisioning request, and iii) a resource operational response time category defining how quickly operational requests are to be fulfilled by the added server;
deriving a set of attributes from the specified qualitative characteristics by reading a set of attributes defined in a profile for the server type of the specified qualitative characteristics, the set of attributes in the profile being defined in terms including the same terms as the quantitative attributes of a discovered servers, wherein the derived attributes are indicative of components of a server ideally suited to fulfill the resource provisioning request;
evaluating the discovered attributes associated with respective ones of available servers against the attributes derived from the specified characteristics; and
selecting, based at least in part on the evaluation, one of the available servers to satisfy the resource provisioning request, wherein the attributes of the selected server best match the attributes derived from the specified characteristics.

16. The method of claim 15, wherein a graphical user interface GUI constrains as user to select from among a set of server types, wherein the server types include a web server type, a database server type, and an application server type.

17. The method of claim 15, wherein the profile information further includes prioritization information and wherein evaluating the attributes of the available servers includes ordering two or more available servers according to the prioritization information.

18. The method of claim 15, further comprising the step of:
testing the performance of the selected server prior to adding the selected server.

19. The method of claim 18, wherein testing the performance includes the steps of:
installing different software configurations on a selected server; and
testing the performance of each software configuration to determine a most efficient configuration.

20. The method of claim 18, wherein testing the performance includes the steps of:
testing the performance of two or more candidate servers; and
selecting the server with the best performance.

21. The method of claim 15, wherein evaluating the discovered attribute includes the step of:
accessing attribute files associated with each available server.

22. The method of claim 15, further comprising the step of:
enabling an administrator to specify the qualitative characteristics for the server of the resource provisioning request.

* * * * *